United States Patent [19]

Meamber

[11] 4,170,933
[45] Oct. 16, 1979

[54] FAST COOKING GRILL

[75] Inventor: Jon F. Meamber, Yreka, Calif.

[73] Assignee: Fast Food Fabricators, Inc., Redding, Calif.

[21] Appl. No.: 772,286

[22] Filed: Feb. 25, 1977

Related U.S. Application Data

[63] Continuation-in-part of Ser. No. 732,542, Oct. 14, 1976, which is a continuation-in-part of Ser. No. 683,373, May 5, 1976, abandoned.

[51] Int. Cl.$^2$ .................. A47J 37/06; A47J 43/18
[52] U.S. Cl. ................................ 99/349; 99/373; 17/25; 99/419
[58] Field of Search ............... 99/324, 349, 372, 350, 99/374, 376, 380, 382, 422, 426, 439, 419, 331, 352; 17/25, 28

[56] References Cited

U.S. PATENT DOCUMENTS

| | | | |
|---|---|---|---|
| 663,483 | 12/1900 | Betts | 99/349 |
| 863,717 | 8/1907 | Jamison | 17/25 |
| 1,965,462 | 7/1934 | Irwin | 17/25 |
| 2,022,842 | 12/1935 | Boettcher | 17/25 |
| 2,720,157 | 10/1955 | Harrison | 17/28 |
| 2,770,182 | 11/1956 | Jensen | 99/373 |
| 3,263,595 | 8/1966 | Bower | 99/349 |

FOREIGN PATENT DOCUMENTS

1585702  1/1970  France ........................... 17/25

*Primary Examiner*—Harvey C. Hornsby
*Assistant Examiner*—Timothy F. Simone

[57] ABSTRACT

The invention is concerned with an apparatus and process for cooking slabs of meat on a grill in reduced time. Briefly the apparatus comprises a generally flat linearly extending weighted generally rectangular member having a grill facing side which has a plurality of generally equal length heat conductive spikes extending therefrom towards the grill, the spikes being of a length to pierce a slab of meat being cooked on the grill and contact the grill. In one preferred embodiment, the apparatus further includes a hinge mechanism adjacent the first end of the member providing pivotal attachment thereof about a horizontal axis adjacent the grill. In said one preferred embodiment and in other embodiments of the invention as well, the apparatus further includes a heat conductive plate having a thickness less than the length of the spikes, the plate having a plurality of holes therethrough through which the spikes slidingly fit, the spikes having a cylindrical or other generally constant cross section portion attached to the grill facing side of the member and a pointed section removed therefrom, and means for preventing said plate from moving away from said member further than adjacent the second ends of the generally cylindrical portions of the spikes whereby the spikes are cleaned and any slabs of meat being cooked on the grill are removed from the spikes.

4 Claims, 21 Drawing Figures

FIG_1

FIG_2

FIG_3

FIG_18

FIG_19

FIG_20

FIG_21

FAST COOKING GRILL

CROSS-REFERENCE TO RELATED APPLICATION

The present application is a continuation-in-part of co-pending application Ser. No. 732,542, filed Oct. 14, 1976 which is a continuation-in-part of co-pending application Ser. No. 683,373, filed May 5, 1976, abandoned.

BACKGROUND OF THE INVENTION

1. Field of the Invention

The invention is concerned with the cooking of slabs of meat such as steaks, hamburgers, fish filets and the like on a grill. More particularly the invention is concerned with a unique and particular apparatus which allows such cooking to be accomplished in a much reduced time yet which allows the grill and the apparatus itself to be easily and quickly cleaned.

2. Prior Art

The prior art shown for example in U.S. Pat. No. 2,411,345 discloses the use of weighted heat conductive members with posts or the like extending from one side thereof for use in skillets to keep bacon or the like flat and to prevent its crinkling. The prior art as shown for example in any of U.S. Pat. Nos. 267,536; 1,790,194; 1,915,962 and 3,736,859 teaches the use of hinged and at times heated upper and lower members such as the top and bottom of a waffle iron for cooking purposes.

The prior art has not however been concerned with providing an apparatus or process particularly adapted to providing very fast cooking of hamburgers and the like in a commercial high volume restaurant. In particular, the apparatus of the prior art is in no way concerned with quick cooking of frozen slabs of meat in short periods of time without shattering the slabs while they are still frozen. Still more particularly the prior art has not been concerned with the providing of an apparatus which would accomplish fast cooking in such an establishment while still retaining sufficient liquids in the meats cooked thereby. Yet further, the prior art has not been concerned with providing an apparatus for use in such establishments wherein the apparatus itself can be readily and quickly removed from a grill whereby an operator can turn meat slabs and whereby the grill with which it is used can be readily greased quickly and/or cleaned. The apparatus of the present invention on the other hand is designed to specifically provide all these necessary functions for high volume cooking of originally frozen hamburgers and the like. The prior art has also not been concerned with providing an apparatus or process from which slabs of meat can be ejected from spikes with concurrent cleaning of the spikes in a fast manner, thus assuring that the apparatus and process can be carried out without significant down-time for special cleaning thereof.

SUMMARY OF THE INVENTION

The invention is concerned with an apparatus for cooking slabs of meat such as steaks, hamburgeres, fish filets, fishburgers and the like on a grill in a significantly reduced period of time. The apparatus comprise a generally flat linearly extending weighted generally rectangular member having a grill facing side which has a plurality of generally equal length heat conductive spikes extending therefrom towards the grill, the spikes being of a length to pierce a slab of meat being cooked on the grill. The apparatus further includes a heat conductive plate having a thickness less than the length of a generally constant cross-section portion of the spike, which generally constant cross-section portion is attached to the first end thereof to the grill facing side of the member, the spikes having a generally pointed portion extending from a second end of the generally constant cross-section portion towards the grill, the plate having a plurality of holes therethrough through which the spikes slidingly fit. Means are provided for preventing the plate from moving away from the member further than adjacent the second ends of the generally constant cross-section portion of the spikes. Said preventing means are so designed that the plate sits against the grill under its own weight when the member is supported by the pointed portion of the spikes.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENTS

Figures 1, 2, 3:
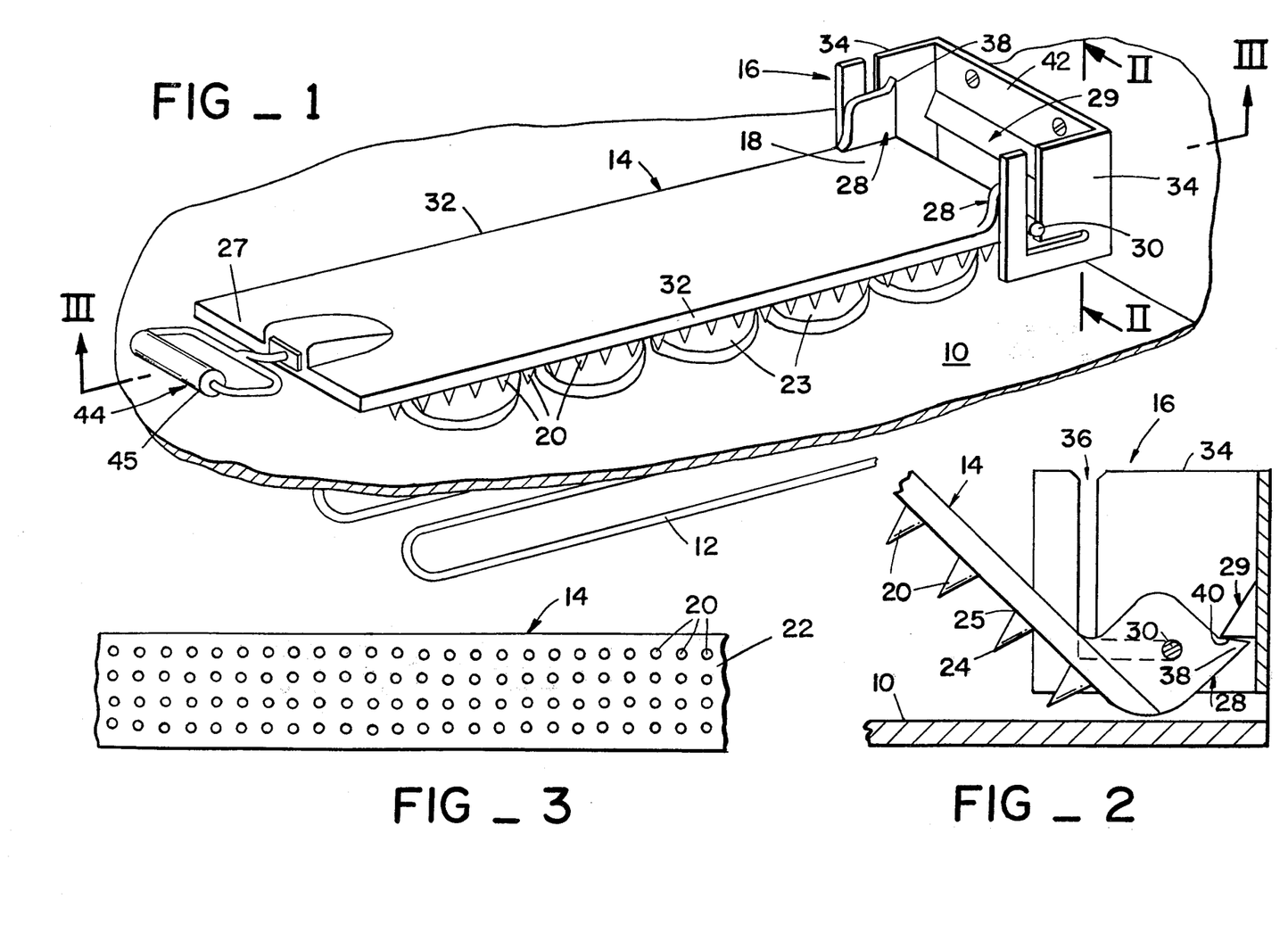
FIG. 1 illustrates a grill including the apparatus of the present invention in perspective.
FIG. 2 illustrates a blow-up view taken along the line II—II of FIG. 1.
FIG. 3 illustrates a view taken along the line III—III of FIG. 1.
Figure 4:
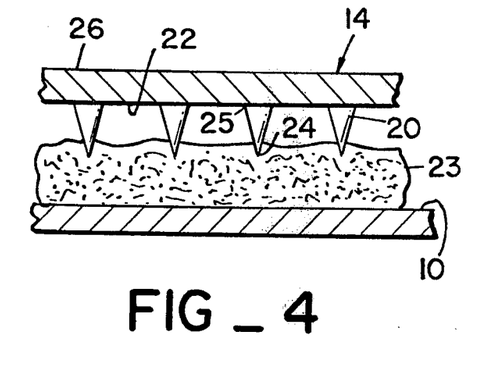
FIGS. 4 and 5 illustrate in blown-up views a portion of the apparatus of the present invention in different stages of operation.
Figure 5:
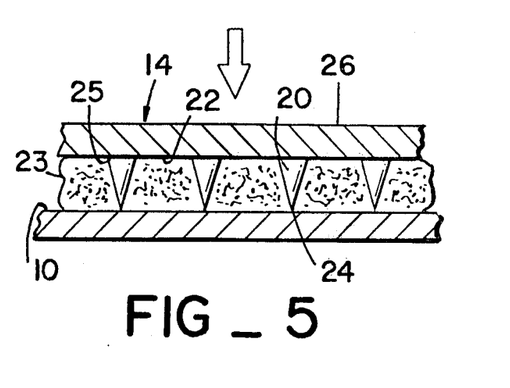

Adverting first to FIG. 1 there is illustrated therein a grill 10 having heating means, in the embodiment illustrated electric heating coils 12 therebelow and having a generally flat linearly extending weighted heat conductive rectangular member 14 attached via hinge means 16 adjacent a first end 18 of the member 14.

The member 14 is generally made of metal such as aluminum, iron, or any other number of steels. A plurality of pointed spikes 20 as will be seen most clearly from FIG. 3 extend in a generally regularly spaced pattern downwardly from a grill facing side 22 of the member 14. The spikes 20 are of sufficient length and extend sufficiently towards the grill 10 to pierce a slab 23 of meat being cooked on to the grill 10 and further extends far enough to pass through the slab 23 of meat and contact the grill 10. This is very important since the spikes as well as the member 14 are generally heat conductive and are generally metallic and more particularly the spikes 20 and the member 14 are generally of integral metallic construction whereby heat is picked up by a tip 24 of each of the spikes 20 which contact the grill 10 thus leading to conductive heating of the member 14 via the spikes 20 and also leading to cooking of the slab 23 of meat by heat transmitted to the slab 23 of meat from the grill 10, from the spikes 20 and from the member 14. Thus, the length of the spikes 20 must be sufficient to allow contact thereof with the grill 10. The length of the spikes 20 should also be sufficient to allow this contacting without significant force being exerted upon the slap 23 by the member 14 to significantly flatten it and force nutritive juices therefrom. In fact, it is not necessary that the member 14 actually contact the slab 23 although such physical contact is desirable to further speed cooking.

As will be noted by reference to FIGS. 1 and 3, the spikes 20 shown therein are generally conical in shape with their base ends 25 being integrally joined to the grill facing side 22 of the member 14 and their tips 24 (apexes) pointing downwardly and contacting the grill 10. It has been found that when meat such as hamburger is cooked between the member 14 and the grill 10 with the spikes 20 piercing the hamburger and contacting the grill 10 then the natural juices of the meat are very adequately retained therein whereby the meat does not shrink excessively on cooking and yet cooking of the meat proceeds in a greatly reduced time generally less than one-half the time of cooking identical slabs 23 of meat on a grill 10 which does not have a member 14 attached thereto. Basically, the member 14 is radiantly heated by the grill 10 and the spikes 20 are conductively heated by the member 14. The tips 24 of the spikes 20 are placed against a grill-removed side 26 of the slabs 23 which are generally frozen and as the spikes 20 are heated locally defrost the slabs 23 and sink therethrough to contact the grill 10. Then the spikes 20 are additionally conductively heated directly from the grill 10 and the meat is thus partially cooked by the spikes 20. It is clear that this provides a very significant advantage in high volume restaurants which utilize a grill as their main meat cooking apparatus.

The member 14 is preferably non-perforate to assure that it will maximally absorb radiated heat from the grill 10 and will maximally conduct heat to the spikes 20 before they contact the grill 10. A non-perforate member 14 is likewise desirable for being heated by conduction through the spikes 20 when they contact the grill 10, the heated member 14 being able to more effectively cook and/or defrost the grill-removed side 26 of the slabs 23.

Referring primarily to FIGS. 1 and 2, the hinge means 16 is shown therein in great detail. It is important to the present invention that the apparatus include stop means for holding the member 14 with the first end 18 thereof adjacent the grill 10 while a second end 27 thereof is spaced from the grill 10. In this manner the member 14 can be held in this position while the operators hands both remain free to allow turning of the slabs 23 so they will cook on the originally grill-removed side 26 thereof. Generally, cooking on the side 25 will not require repositioning of the member 14 in contact with the slabs 23 since the slabs 23 will already be defrosted and, in fact, partially cooked. If desired, however, the member 14 can be quickly rotated into contact with the slabs 23 after they have been turned to provide yet faster cooking. This allows the grill 10 and the grill facing side 22 of the member 14 to be cleaned without removal of the member 14 from the hinge means 16.

As will be apparent by reference to FIGS. 1 and 2 the stop means generally includes first partial stop means 28 which extends from the member 14 adjacent the first end 18 thereof and second partial stop means 29 which extend from the hinge means 16. The hinge means 16 in the particular embodiment illustrated comprise a pair of posts 30 which extend latitudinally, one from each of a pair of longitudinally extending edges 32, each of the posts 30 extending parallel to the member 14 from adjacent the first end 18 thereof. The pair of posts 30 in a manner which will be explained shortly serve as a movable horizontal axis attaching the member 14 to adjacent the grill 10. The hinge means 16 further includes a pair of generally parallel walls 34 each generally perpendicular to the grill 10 and spaced from one another a distance generally equal to the separation of the posts 30. The walls 34 each have groove means 28 receiving the posts 30. The first partial stop means 28 generally comprise nub means such as a pair of nubs 38 extending from adjacent the posts 30. The second parallel stop means 29 comprise ledge means, in the embodiment illustrated a ledge 40. Generally, the ledge 40 will proceed from a bridge 42 which spans the distance between the walls 34 and is generally formed integral therewith. It is clear that the groove means 36 provides a first position for the posts 30 wherein the spikes 20 contact the grill and a second position for the posts 30 wherein the pair of nubs 38 are held by the ledge 40 and the member is thereby held with the second end 27 thereof spaced from the grill 10 while the first end 18 thereof is retained adjacent the grill 10.

On inspection of FIG. 1 it will further be apparent that the groove means 36 also provide a third position for the posts 30 wherein the posts 30 are a distance up a vertical leg of the L-shaped groove means and the tips 24 of the spikes 20 sit upon the grill-removed side 26 of the frozen slabs 23. As the spikes 20 pierce the slabs 23 the posts 30 proceed downwardly towards their first position.

Preferably the member 14 includes adjacent the second end thereof handle means such as a handle 44 extending therefrom. The handle 44 will include a non-conductive portion 45 whereby someone operating the grill will not be injured by gripping the handle 44.

First Alternate Embodiment

Figure 6:
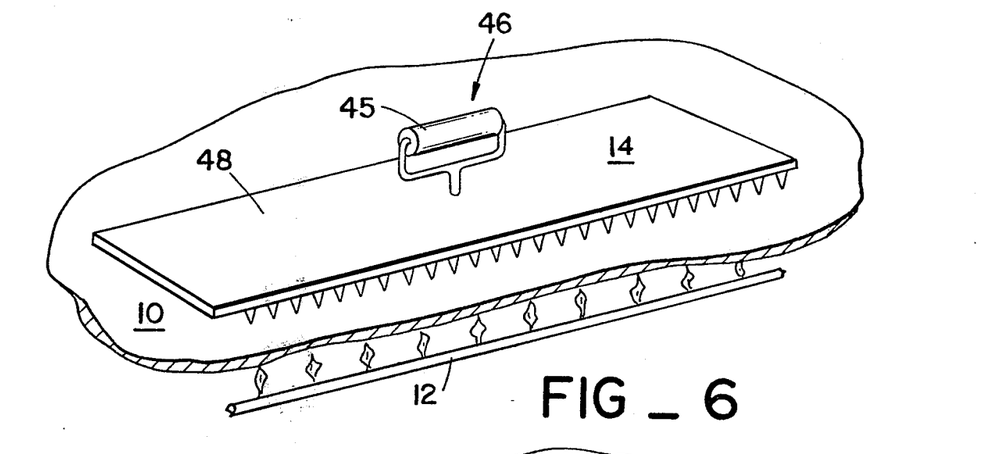
FIG. 6 illustrates a first alternate embodiment of the apparatus of the present invention.

Turning now to FIG. 6 there is illustrated therein a version of the apparatus of the present invention which does not include the hinge means 16. The member 14 includes the spikes 20 on the grill facing side 22 thereof and also includes a single handle 46 having a non-conductive portion 45 upraised generally centrally from a non-grill facing side 48 thereof. Operation is as with the previously described embodiment with the exception that the operator simply lifts the member 14 upwardly using the handle 46 when turning of the slabs 23, positioning of frozen slabs 23 and/or cleaning or greasing of the grill 10 is carried out. The member 14 is simply set aside during these operations to free both hands of the operator.

Second Alternate Embodiment

Figure 7:
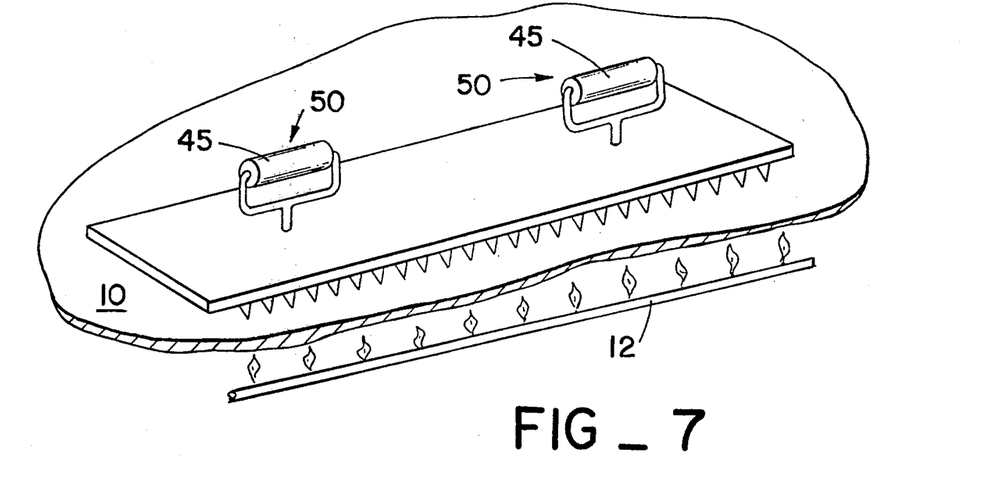
FIG. 7 illustrates a second alternate embodiment of the present invention.

Turning now to FIG. 7 there is illustrated therein a version of the apparatus of the present invention differing from the first alternate embodiment only in that a pair of handles 50 replace the single handle 46. This embodiment is particularly useful with larger members 14.

Third Alternate Embodiment

Adverting now to FIG. 8, there is illustrated therein a version of the apparatus of the present invention differing from the first embodiment of the present invention in that an additional handle 46' is included therewith along with the handle 44 and further wherein in this third alternate embodiment the cleaning-ejection structure illustrated most clearly in FIGS. 10–13 as discussed below forms an important part thereof.

Fourth Alternate Embodiment

Figure 9:
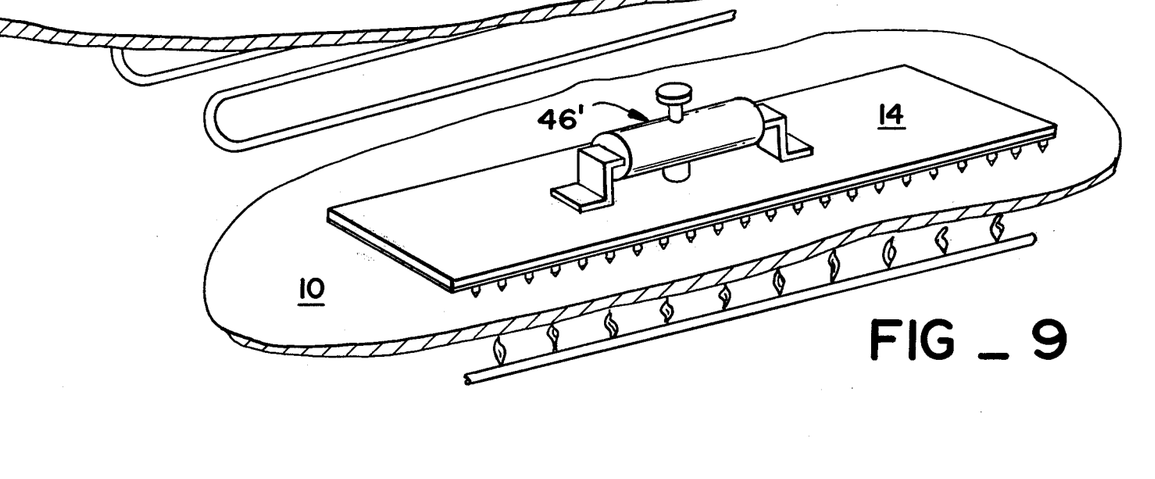
FIG. 9 illustrates a fourth alternate embodiment of the present invention.

Referring now to FIG. 9, there is illustrated therein a version of the apparatus of the present invention differing from the third alternate embodiment in that the handle 44 does not form a part thereof and the hinge means 16 likewise does not form a part thereof.

Cleaning-Ejection Embodiments

Figure 8:
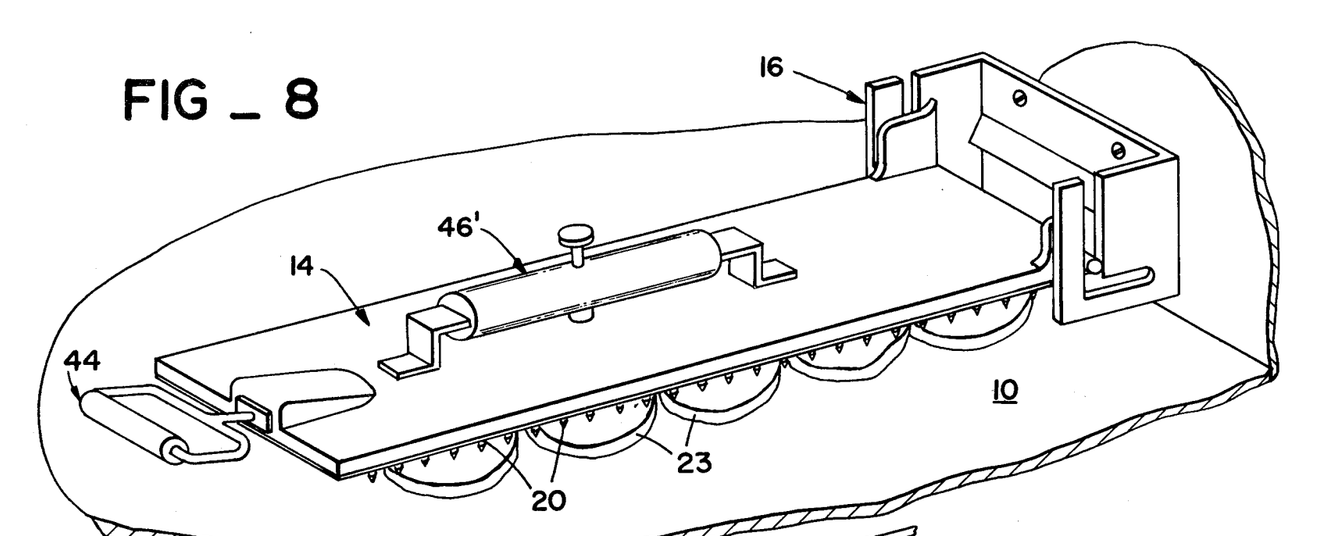
FIG. 8 illustrates a third alternate embodiment of the present invention.

As will be seen by reference to FIGS. 8 and 9 the apparatus of the present invention can advantageously include certain structural features which serve to eject the slabs 23 away from the member 14 and at the same time serve to clean off the spikes 20. Basically, the embodiments illustrated in FIGS. 8–13 use pointed spikes 20 which include a generally constant cross-section portion 52 which may be cylindrical or may have other generally constant cross-section shape attached at a first end 54 thereof. These spikes 20 may be integral with and of the same metallic construction as the member 14, but more usually will be removably secured to the member 14 by threads or the like to allow replacement thereof. The spikes 20 end generally in a point 24 which proceeds from a second end 56 of the generally constant cross-section portion 52.

Further, fitting generally against the grill facing side 22 of the member 14 is a plate 58 having a plurality of holes 60 therethrough with the generally constant cross-section portions 52 of each of the spikes 20 slidingly fitting within a respective one of the holes 60. The plate 58 is made of a heat conductive material, generally a metallic material, such as, for example, steel. The heat conductive plate 58 has a thickness which must be less than the length of the generally constant cross-section portion 52 of the spikes 20 to allow proper positioning of the slabs 23.

Figures 10, 11, 12, 13:
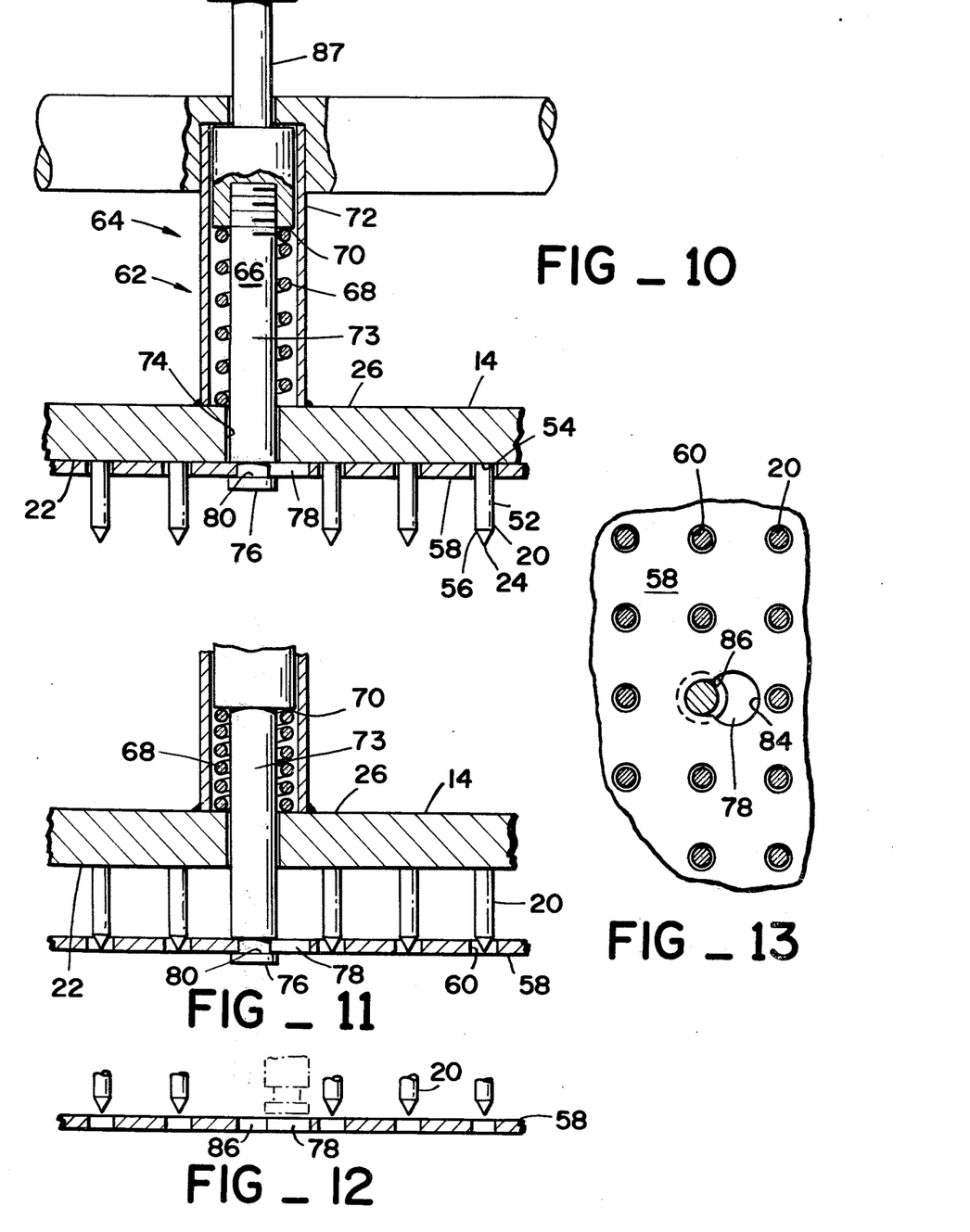
FIGS. 10-13 illustrate an improved ejection-cleaning structure for use with all embodiments of the present invention.
Figure 14:
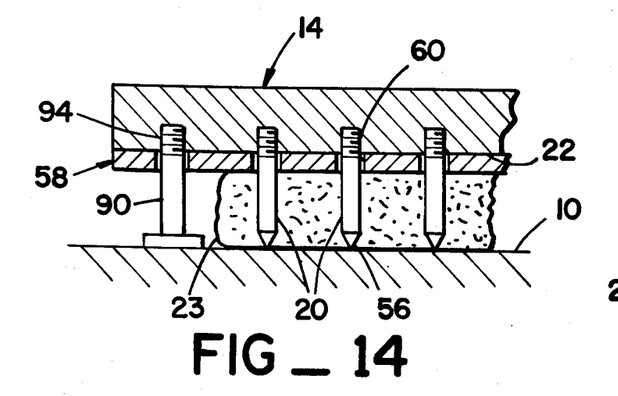
FIGS. 14-17 illustrate an alternate ejection-cleaning structure for use with all embodiments of the invention.

Biasing means 62 serve to bias the plate 58 to be adjacent the grill facing side 22 of the member 14. Moving means 64, in the embodiment illustrated a piston 66 is provided for moving the plate 58 against the force exerted by the biasing means 62 and to thus overcome said biasing means 62 so that the plate 58 is moved to be adjacent the second ends 56 of the generally cross-section portion 52 of the spikes 20. In the embodiments as illustrated in FIGS. 8–13, the biasing means comprises a spring 68 acting between the grill-removed side 26 of the member 14 and a shoulder 70 of the piston 66. A sleeve 72 extends upwardly from the grill-removed side 26 of the member 14 to hold the spring 68 and to guide the piston 66. The member 14 includes a bore 74 passing therethrough through which a narrowed detachable portion 73 of the piston 66 extends. A bottom 76 of the piston 66 passes through an opening 78 in the plate 58 and fastening means, for example, an annular groove 80 serves to fasten the plate 58, releasably and securely to the bottom end 76 of the piston 66. The opening 78 in the plate 58 as seen in FIG. 13, generally includes a larger portion 84 and a narrower portion 86. Thus, the plate 58 can easily be removed or placed upon the bottom end 76 of the piston 66 as by simply sliding the plate 58 so that the bottom 76 of the piston 60 is in the larger portion 84 of the opening 78 in the plate 58. This allows the plate 58 to be easily removed for cleaning of the member 14. A top portion 87 of the piston 66 preferably passes through the handle 46' or 50 so that the thumb or heel of an operator's hand can easily and controlably propel the piston 66 and thereby also the plate 58 downwardly.

A major advantage of the structure illustrated in FIGS. 8–13 is that when the piston 66 is pushed downwardly any slabs 23 are pushed off of the spikes 20 by the plate 58 and at the same time the holes 60 clean any meat which might be sticking thereto off of the generally constant cross-section portions 52 of the spikes 20. It has been found that this is extremetly advantageous and significantly cuts down on the time necessary for cleaning and repairing the apparatus of the present invention and also very significnatly cuts down on the number of slabs 23 which might be damaged by sticking to the spikes 20. It should be noted that it is extremely advantageous to have the biasing means 62 and moving means 64 adjacent the handle 46' or 50 as the case may be and as illustrated in FIGS. 8 and 9, so that one can at the same time grasp the respective handle and push downwardly upon the respective piston 66. With particular reference to FIG. 8, it is noted that the use of an additional handle 46' and associated plate 58 and piston 66 is still desirable in these embodiments of the invention which have the handle 44 since the same problem of sticking on the spikes 20 can occur and can be solved in a like manner. On the other hand, the advantages of having the handle 44 remain as previously stated, namely ease in cleaning. For cleaning of the plate 58 and/or the member 14 one may rotate the second end 27 of the member 14 upwardly about the posts 30 and into position illustrated as for example in FIG. 2.

Alternate Cleaning-Ejection Embodiment

FIGS. 14–17 illustrate an alternate cleaning-ejection embodiment of the present invention which is useful with all of the previously described embodiments including those which have cleaning-ejection apparatus as illustrated in FIGS. 10–13. In partiucular, the alternate cleaning-ejection embodiment comprises means for preventing the plate 58 from moving away from the member 14 further than to adjacent the second ends 56 of the generally constant cross-section portions 52 of the spikes 20. Said means can comprise, for example, a pair of retaining posts 90, one at each end of the plate 58, with each of the posts 90 comprising bolt means having a head 92 at one end thereof, an intermediate section 93 and screw thread means 94 at the other end thereof, which posts are attached to the member 14 at said other end via said screw thread means 94. The plate 58 includes a pair of holes 96 therethrough one adjacent each end thereof and the intermediate sections 93 of the posts 90 each fit slidingly within a respective one of the holes 96. The heads 94 of the posts 90 prevent the plate 58 from moving further than to adjacent the second ends 56 of the generally constant cross-section portions 52 of the spikes 20. The posts 90 within the holes 96 also help to keep the plate 58 aligned properly whereby it slides downward generally uniformly about all of the spikes 20.

The plate 58 is generally made heavy enough so that gravity will cause it to eject the slabs 23 when the member 14 is lifted, as for example by using any of the handles 44, 46, 46' or 50. However, the plate 58 can alternately or additionally be propelled to eject the slabs 23 under the impetus of the biasing means 62 as illustrated in bottom view in FIG. 17. The posts 90 are advantageously used in combination with the biasing means 62 although the biasing means 62 itself via the bottom end 76 of the piston 66, serves to limit movement of the plate 58 away from the member 14. In particular, the posts 90 serve to properly align the plate 58 so that it moves downward generally uniformly about all of the spikes 20.

Figure 15:
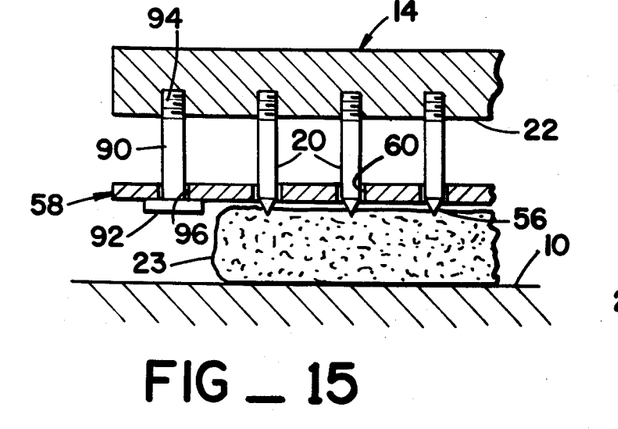
Figure 16:
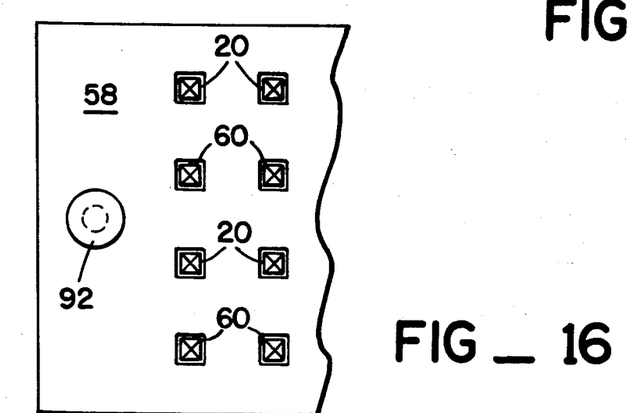
Figure 17:
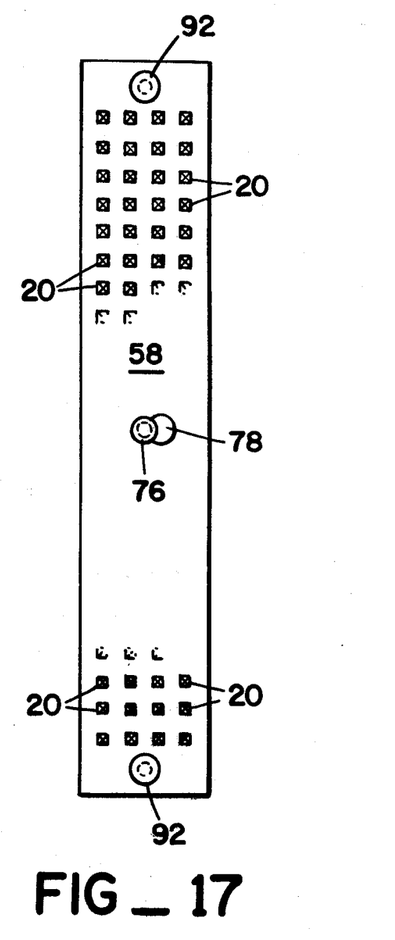
Figure 18:
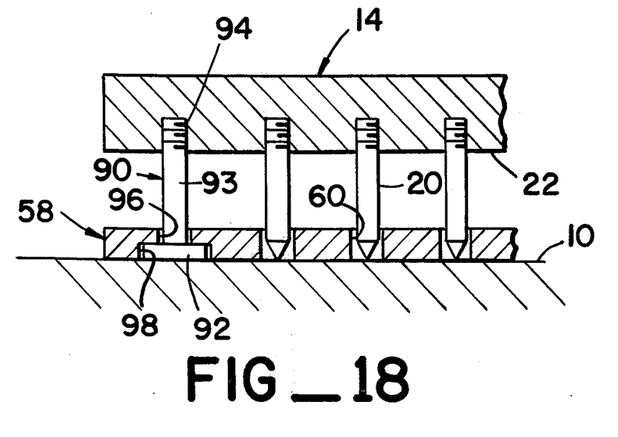
FIGS. 18-21 illustrate an alternate ejection-cleaning structure for use with all embodiments of the invention.
Figure 19:
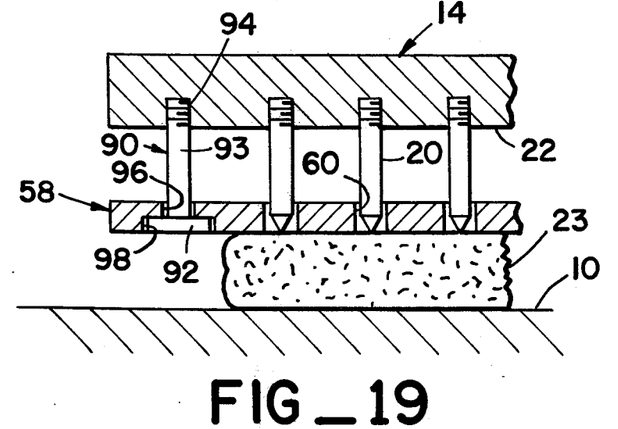
Figure 20:
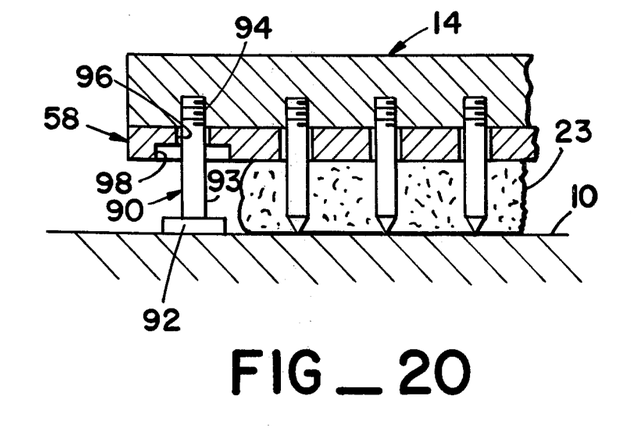
Figure 21:
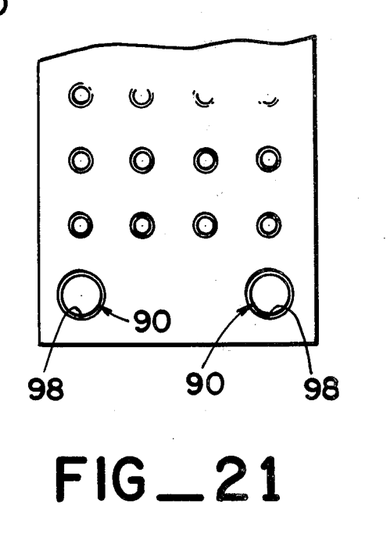

FIG. 16 further illustrates that the holes 60 inin the plate 58 can be square or of other shape to match non-cylindrical but generally constant cross-section portion 52 of the spikes 20. FIG. 15 specifically illustrates screw thread attachment of removably secured spikes 20 to the member 14.

Additional Alternate Cleaning-Ejection Embodiment

FIGS. 18–21 illustrate an alternate cleaning-ejection embodiment of the present invention which is useful with all of the previously described embodiments including those which have cleaning-ejection apparatus as illustrated in FIGS. 10–17. In particular the alternate cleaning-ejection embodiment comprises a modification of the means for preventing the plate 58 from moving away from the member 14 further and to adjacent the second end 56 of the generally cross-section portions 52 of the spikes 20. In the alternate embodiment illustrated in FIGS. 18–21 said means can comprise, for example, a plurality of retaining posts 90, for example two at each end of the plate 58, with each of the posts 90 comprising bolt means having a head 92 at one end thereof, an intermediate section 93 and screw thread means 94 at the other end thereof, which posts 90 are attached to the member 14 at said other end via said screw thread means 94. The plate 58 includes holes 96 therethrough adjacent each end thereof in one to one relation with the posts 90 and the intermediate sections 93 of the posts 90 each fit slidingly within a respective one of the holes 96. The heads 92 of the posts 90 fit within a countersunk bore 98 which is sufficiently deep so that each of the heads 92 is held therewithin. Thus, the plate 58 is allowed to slide down far enough so that it actually contacts the grill 10 thus allowing the plate 58 to be heated by the grill 10 when meat slabs are not being cooked. This results in a significant decrease in cooking time of the slabs 23 and further leads to a significant power use reduction, generally 15 to 20%, in the heat supplied to grill. The bottom 76 of the piston 66 is likewise countersunk within a countersunk bore 100 in the plate 58 to allow the aforementioned contact of the plate 58 with the grill 10. It should be noted that while the member 14 has generally been referred to as rectangular, it is contemplated as falling within the scope of the present invention to also utilize members 14 and overall apparatus of a different shape, for example round or oval.

Operation

Operation of the process and apparatus of the present invention will be explained by reference to the embodiment illustrated in FIGS. 1–5. It is clear that the embodiments illustrated in FIGS. 6 and 7 operate in generally the same manner with only the modifications set out previously.

In operation, the member 14 is positioned with its first end 18 adjacent the grill 10 and its second end 26 removed from the grill by sliding the posts 30 in the L-shaped groove means 36 until the pair of nubs 38 are caught beneath the ledge 40. The grill and if desired the member 14 are then coated as needed with cooking oil, grease, or other lubricant. One or more, generally a plurality of slabs 23 of meat such as hamburger or the like, generally frozen, are placed upon the grill 10 and the operatore then pulls upon the handle 44 towards himself whereby the post 30 slide within the horizontal portion of the L-shaped groove means 36 thus freeing the pair of nubs 38 from the ledge 40 whereby the second end 27 of the member 14 is swung downwardly and the spikes 20 pierce, or in the case of frozen slabs 23 generally contact the slabs 23 of meat. The tips 24 of the spikes 20 pierce the frozen slabs 23 as the member 14 is radiantly heated by the grill 10 and sink through the slabs 23 by defrosting them locally. In a very short time, generally within about 20 to 30 seconds, the tips 24 contact the grill 10. The member 14 is generally not heated by any heating means such as the coils 12 but instead is simply heated initially by radiation from the grill 10 and later also by conduction through the spikes 20. The slabs of meat on the grill are then cooked by heat which comes up from the grill 10 spreads outwardly from the spikes 20 and comes downwardly from the member 14. In this manner cooking is accomplished in a very short time.

After the desired amount of cooking on the bottom side of the slabs 23 has been attained, the handle 44 is lifted upwardly, the nubs 38 are caught beneath the ledge 40 and the slabs 23 of meat are turned over and cooked on the other side thereof, with or without the member 14 being placed thereatop. Thereafter the cooked slabs 23 are removed and additional frozen slabs 23 of meat are put in place. After the handle 44 is lifted upwardly and before other slabs 23 of meat are put in place the posts 30 are pushed within the horizontal portion of the L-shaped groove means 36 until the nubs 38 are caught beneath the ledge 40. This allows the operator to have nboth hands free to position more slabs 23 of meat for cooking. Also, in this position the grill 10, the spikes 20 and the grill facing side 22 of the member 14 can be easily cleaned if necessary. What results is thus a quick cooking, easy to use, easy to clean apparatus which allows an operator thereof to have both hands free during the time when meat slabs 23 are placed on, turned over and removed from the grill and which allows the grill and all its components to be easily cleaned without removal of the member 14 therefrom.

In those embodiments of the present invention wherein a plate 58 is included therein, namely, in those embodiments illustrated in FIGS. 8–21, the cooked slabs 23 can be expelled from the bottom of the apparatus by pressing downwardly upon the piston 56 (in the embodiments of FIGS. 8–13), thus overcoming the biasing means 62 or by simply lifting the member 14 upwardly (as in FIGS. 14–21) whereby the weight of the plate 58 expels the slabs 23. The generally constant cross-section portions 52 of the spikes 20 are at the same time cleaned off.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A portable self-cleaning apparatus for cooking slabs of meat at an arbitrary position on a grill in a reduced time, comprising:

a generally flat heat conductive weighted member having a grill facing side which has a plurality of generally equal length heat conductive spikes extending therefrom towards said grill, said spikes each being directly connected at a first end thereof to said weighted member to extend from said grill facing side of said member and having a generally pointed portion extending towards said grill at a second end thereof, the weight of said weighted member being sufficient to force said spikes through slabs of meat positioned thereunder;

a heat conductive plate having a grill facing surface, being of a sufficient weight to eject said meat slabs and having a thickness less than the length of said spikes, said plate having a plurality of holes therethrough corresponding to said plurality of spikes through which said spikes slidingly fit, said plate being freely slideable along said spikes and devoid of spring coupling to said weighted member such that said plate is urged toward said grill by gravity alone independent of said weighted member and does not affect said weighted member's forcing said spikes through said slabs; and means for preventing said plate from moving a distance greater than the length of said spikes away from said weighted member while allowing said plate to assume a position with said grill facing surface adjacent the second ends of said spikes wherein said plate and said spikes contact said grill when said apparatus is placed directly on said grill, in which position said grill directly conductively heats said plate and said spikes and further heats said weighted member through said spikes such that subsequent placement of said apparatus over said slabs causes said weighted member to urge said spikes through said slabs to cook said slabs partially from within, and causes said plate to contact the surface of said slabs remote from said grill to cook said slabs partially from above said spikes being cleaned and any slabs of meat being cooked on said grill being removed from said spikes by the weight of said plate alone when said weighted member is moved away from said grill.

2. An apparatus as in claim 1, wherein said preventing means comprises a plurality of posts extending generally parallel to said spikes, each of said posts extending through a respective post hole in said plate and terminating in a respective head of larger dimension than said respective post hole and a plurality of countersunk bores in said plate communicating with said post holes, each of said bores receiving a respective head of a respective post completely therein.

3. An apparatus as in claim 2, wherein said posts are removably secured to said member.

4. An apparatus as in claim 3, wherein said member is generally non-perforate and including handle means extending upwardly from a non-grill facing side of said member.

* * * * *